Feb. 28, 1928.　　　　　　　　　　　　　　　　1,661,063
E. A. BARBET
APPARATUS FOR THE PRODUCTION OF FORMOL BY CATALYSIS
Filed Oct. 23, 1923
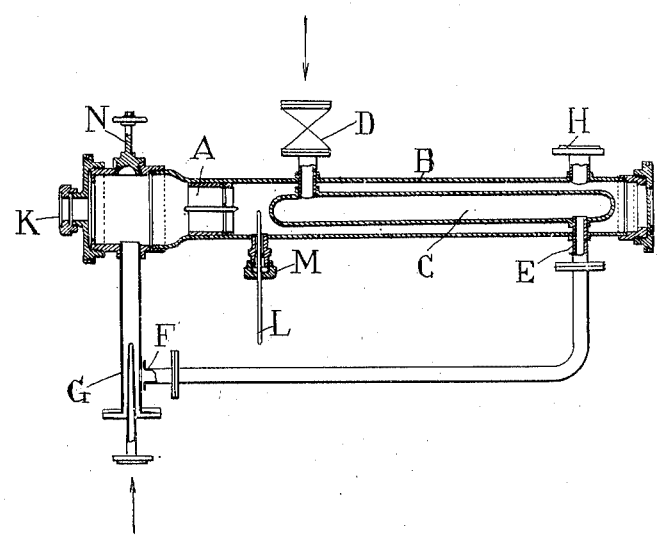
Inventor
E. A. Barbet
By Marks & Clerk
Attys.

Patented Feb. 28, 1928.

1,661,063

UNITED STATES PATENT OFFICE.

EMILE AUGUSTIN BARBET, OF PARIS, FRANCE.

APPARATUS FOR THE PRODUCTION OF FORMOL BY CATALYSIS.

Application filed October 23, 1923, Serial No. 670,369, and in Belgium October 30, 1922.

The catalyzer for converting methyl-alcohol into formol or formaldehyde is a closely wound coil of copper metal cloth. This catalyzer is previously heated, and a suitable mixture of air and vapour of methyl-alcohol is caused to pass through it. The resulting oxidation is an exothermic one, which maintains the catalyzer at the desired temperature of dark red heat.

Nevertheless, on thoroughly analyzing the phenomenon it will be found that the exothermic character of the reaction is due to the fact that the oxidation of a portion of the methyl alcohol has not stopped at the stage of aldehyde but has proceeded further, with the production of carbonic acid and water vapour, so that the yield of formol is considerably less than it would be if the destruction of the methyl alcohol had been avoided.

On the other hand it has likewise been observed that it is advantageous that the mixture of the vapours which are formed and the excess air shall be cooled as quickly as possible on issuing from the incandescent masses because otherwise the yield will be further diminished.

Somewhat similar is the experience in other catalytic reactions where the heat contained in the reaction product has been employed for raising the temperature of the reaction mixture delivered to the catalyst by, for example, employing a heat interchanger comprising two concentric tubes, through the inner of which or the space between the inner and outer tube the reaction mixture passes to the catalyst located within a portion of one of the tubes, the reaction product passing through the space between the tubes or through the inner tube, as the case may be.

The object of the present invention is to provide an improved apparatus for the manufacture of formaldehyde by catalysis.

One embodiment of this invention is illustrated by way of example in the accompanying drawing which is a diagrammatic sectional elevation of a practical form of the improved apparatus.

As shown, the catalyzing mass of copper is clamped at A in the front portion of the catalyzing tube B. C is an internal concentric tube designed for heating the air that is necessary for the reaction. The entry of this air is adjustable by means of a tap D. The very hot air issues at E and passing through a branch pipe, enters at F the pipe which supplies the methyl-alcohol vapour. This vapour enters through the inner nozzle G and mixes intimately with the very hot air.

In this manner the mixture of alcohol vapour and air is superheated when it enters the catalyzing mass, and consequently it takes from the latter much less heat, and therefore does not waste so much alcohol by integral combustion.

On the other hand, the gases and vapours at very high temperature coming from the catalyst are wire-drawn in the very narrow annular space between the two tubes B and C. This is an excellent condition for effecting the exchange of temperature, because this exchange is a function of the velocity of the gases. There is consequently a rapid cooling by means of B and C at one and the same time in accordance with the object in view.

The half-cooled gases pass out at H on their way to washing and condensing apparatus. K is a peep-hole glazed with a sheet of mica for the purpose of viewing the colour of the catalyst. Its temperature is increased or diminished by increasing or diminishing the quantity of air admitted through D.

A formol-producing apparatus comprises a plurality of the elements described above connected together to form a battery.

The rod L composed of two metals is an electrical couple for actuating the pointer or dial of a pyrometer (not shown). The rod L extends through a stuffing box M.

N is a screw plug by means of which the ignition is effected for starting the apparatus.

By means of these devices the catalysis can be very easily regulated, and good yields of formaldehyde obtained.

What I claim is:—

Apparatus for the manufacture of formaldehyde from methyl alcohol and an oxygen-containing gas by catalysis comprising a chamber in which a catalyst is located, a mixing device adapted to bring together the methyl alcohol and the oxygen-containing gas, means adapted to lead the mixture from said mixing device to the chamber, a tube extending from the chamber for leading away the reaction product, a chamber located within the tube concentrically therewith, a tubulure in said last-mentioned chamber adapted to be connected with the supply of oxygen-containing gas and a tubular connection extending from said chamber through the wall of the tube for leading from the chamber the oxygen-containing gas heated in its passage therethrough back to the mixing device in which the mixture of methyl alcohol and oxygen-containing gas supplied to the catalyst is formed.

In testimony whereof I have signed my name to this specification.

EMILE AUGUSTIN BARBET.